United States Patent
Moretto (10) Patent No.: US 9,440,802 B2
(45) Date of Patent: Sep. 13, 2016

(54) PLANT FOR THE CONTROLLED-SPEED PNEUMATIC TRANSPORT OF GRANULAR MATERIAL AND CONVEYANCE SPEED CONTROL PROCESS

(71) Applicant: Renato Moretto, Padua (IT)

(72) Inventor: Renato Moretto, Padua (IT)

(73) Assignee: MORETTO S.P.A., Massanzago (Padua) (IT)

( * ) Notice: Subject to any disclaimer, the term of this patent is extended or adjusted under 35 U.S.C. 154(b) by 0 days.

(21) Appl. No.: 13/752,323

(22) Filed: Jan. 28, 2013

(65) Prior Publication Data

US 2013/0202370 A1    Aug. 8, 2013

Related U.S. Application Data

(62) Division of application No. 12/155,996, filed on Jun. 12, 2008, now Pat. No. 8,360,691.

(51) Int. Cl.
- B65G 53/00    (2006.01)
- B65G 53/24    (2006.01)
- B65G 53/66    (2006.01)

(52) U.S. Cl.
CPC .............. B65G 53/24 (2013.01); B65G 53/66 (2013.01); *Y10T 137/0396* (2015.04); *Y10T 137/86187* (2015.04)

(58) Field of Classification Search
USPC ............. 406/14, 17, 94, 122, 144, 153, 169, 406/173, 175, 192, 194, 197
See application file for complete search history.

(56) References Cited

U.S. PATENT DOCUMENTS 3,870,375 A * 3/1975 Duncan et al. ............... 406/127
4,318,643 A * 3/1982 Larsson et al. ................ 406/14
4,464,184 A * 8/1984 Cera et al. ...................... 95/19
4,480,947 A * 11/1984 Nagasaka ...................... 406/14
4,501,518 A * 2/1985 Smith ............................. 406/25
4,718,795 A * 1/1988 Dugge ........................... 406/30
4,770,611 A * 9/1988 Heyl ............................. 417/147
4,907,892 A * 3/1990 Paul ............................. 366/101
5,813,801 A * 9/1998 Newbolt et al. ............... 406/14
6,379,086 B1 * 4/2002 Goth ....................... B29C 47/10
                                                      406/130
6,447,215 B1 * 9/2002 Wellmar ................ B65G 53/66
                                                      406/11
6,588,988 B2   7/2003 Zlotos
7,228,990 B2 * 6/2007 Schmidt ..................... B28C 5/40
                                                      141/83
8,113,745 B2 * 2/2012 Aoki ............................ 406/197
8,430,605 B2 * 4/2013 Dietterich .............. B65G 23/00
                                                      290/43

(Continued)

FOREIGN PATENT DOCUMENTS

DE    195 17 793 A1    11/1996
DE    299 14 892 U1    3/2000

(Continued)

*Primary Examiner* — Joseph Dillon, Jr.
(74) *Attorney, Agent, or Firm* — Davis & Bujold PLLC; Michael J. Bujold (57) ABSTRACT

The invention relates to a plant for the transport of granular material comprising at least one container for granular material to be transported, at least one receiver-meter group, at least one conveyance duct, depressurization-pressurization means arranged to suction/inject a gaseous medium from/into said at least one container, and at least one vacuum duct between a receiver-meter group and said depressurization-pressurization means, thereby creating a flow of said granular material and said gaseous medium in said at least one conveyance duct and a flow of gaseous medium between said at least one receiver-meter group and said depressurization-pressurization means.

6 Claims, 6 Drawing Sheets

(56) References Cited

U.S. PATENT DOCUMENTS

| | | | |
|---|---|---|---|
| 8,491,228 B2* | 7/2013 | Snowdon | 406/169 |
| 8,591,098 B2* | 11/2013 | Kemp et al. | 366/160.1 |
| 2005/0039816 A1* | 2/2005 | Maguire | 141/8 |
| 2007/0151623 A1* | 7/2007 | Poole et al. | 141/83 |
| 2011/0104006 A1* | 5/2011 | Kariyama et al. | 422/39 |
| 2011/0285045 A1* | 11/2011 | Bazzica | 264/39 |

FOREIGN PATENT DOCUMENTS

| | | |
|---|---|---|
| DE | 202 20 578 U1 | 1/2004 |
| EP | 2 003 075 A1 | 12/2008 |
| FR | 2 812 864 A1 | 2/2002 |
| GB | 1 428 498 | 3/1976 |
| JP | S6067325 A | 4/1985 |
| JP | H09202448 A1 | 8/1997 |
| WO | 02/075156 A1 | 9/2002 |

* cited by examiner

Figure 7

PLANT FOR THE CONTROLLED-SPEED PNEUMATIC TRANSPORT OF GRANULAR MATERIAL AND CONVEYANCE SPEED CONTROL PROCESS

FIELD OF INVENTION

The present invention regards a plant for the controlled-speed pneumatic transport of granular material, particularly but not exclusively suitable for the transport of granular material made of plastic material, as well as a process related thereto.

BACKGROUND OF INVENTION

With the terms "granules" or "granular", it is intended to indicate in the present description and in the claims the small scales, sheets or plates produced by the grinding-crushing of slab, sheet, film and the like plastic material. In the plants for working and/or transforming plastic materials reduced into granules, granular material is transported from a storage container to one or more machines designed to use such a material and usually comprising injection or thermoforming presses, by means of a pneumatic conveyance or transport system, preferably operating under reduced pressure. The transport system must ensure a minimum flow rate of granular material, thereby ensuring a continuous feed of granular material to the transformation machine or machines.

In reduced-pressure transportation systems of granular material proposed up to now, a vacuum source is provided, e. g. a vacuum pump, arranged to suck air from a container of granular plastic material. The granular material is thus driven by the suctioned air along a suction tubing which leads above, and discharges the granular material into, a collection tank, whereas the transport air is suctioned to convey towards the vacuum source. Between the collection tank of the granular material and the vacuum source, a filter is provided to filter the air, which has just separated from the bulk of the granular material, before it reaches the vacuum source. An electronic control unit controls the entire cycle. As a matter of fact, it is the atmospheric pressure that pushes the granular material along the tubing towards the vacuum source.

For a correct conveyance of the granular plastic material within the ducts or tubing, the air flow created by the vacuum source must flow within a desired speed range, both to prevent the material from being conveyed at overly high speeds deemed "dangerous", and to prevent the stagnation of the granular material if the conveyance speed is not sufficiently high.

One of the most difficult problems to solve in the reduced pressure transport of granular material within conveyance ducts is that of being suitable for maintaining its transfer speed constant, even with the change of light or section of the ducts and/or configuration (curved, rectilinear) of the tubes along which the conveyance is carried out.

In the conventional plants, and in particular along the transport tubing, the speed of a granular material is usually not maintained constant over time. In the various conveyance steps carried out in a conventional reduced-pressure transport plant, the conveyed plastic material granules usually reach very high speeds, even double the optimum speed. When high speeds are reached, plastic material granules scrape against the walls, especially at the curved tubing sections, and due to the combined effect both of the centrifugal force and the electrostatic charges and to the friction they tend to adhere to the walls and to form thin film encrustations or deposits on the walls themselves. Such deposits, after a certain lapse of plant functioning time, are detached from the tubing walls, giving rise to multilayer crusts or scales of materials that are even different from each other, considering that they are usually fed in different cycles through one same tubing. The multilayer crusts or scales that are detached from the walls constitute a source of pollution/contamination for the granular materials that are conveyed along the tubing after their detachment from the inner wall of the tubing itself. This phenomenon is called "angel hair" formation in jargon.

SUMMARY OF THE INVENTION

The main object, therefore, of the present invention is that of providing a plant for the reduced pressure transport of granular material along tubing in optimal flow speed or intensity conditions for the specific transported granular material, thus avoiding both the formation of granular material on the walls of the tubing and undesired stagnations of the granular material.

Another object of the present invention is to provide a plant for the reduced pressure transport of granular material that permits significantly reducing the operating costs with respect to the conventional plants.

Another object of the present invention is that of providing a process for transporting granular material that provide for adapting the flow speed or intensity to the specific granular material to be conveyed along the transport ducts.

According to a first aspect of the present invention, a plant for the transport of granular material comprising at least one container for at least one granular material to be transported, at least one receiver-meter group designed to receive granular material from said at least one container, at least one conveyance duct of said granular material from said at least one container to said at least one receiver-meter group, depressurization-pressurization means arranged to suction/inject a gaseous medium from/into said at least one container, and at least one vacuum duct between said at least one receiver-meter group and said depressurization-pressurization means, thereby creating a flow of said granular material and said gaseous medium in said at least one conveyance duct or line directed to said at least one receiver-meter group and a flow of gaseous medium between said at least one receiver-meter group and said depressurization-pressurization means, said plant comprising detection means of parameters of said flow located in said at least one vacuum duct or line, adjusting means of the power of said depressurization/pressurization means and electronic control means designed to receive in input control signals from said speed detection means and to emit control signals in output for driving said adjusting means.

According to another aspect of the present invention, a conveyance speed control process is provided of a granular material along at least one conveyance line between at least one container of the granular material to be conveyed and at least one receiver-meter group of the same comprising:

the application of a depressurization-pressurization to said granular material through at least one conveyance duct extending between said at least one container and said at least one receiver-meter group and through said at least one vacuum line or duct, whereby suctioning/injecting a gaseous medium from/into said at least one container and to create a flow of said granular material and said gaseous medium along said at least one conveyance duct directed to said at least one receiver-meter group and a flow of gaseous medium between said at least one receiver-meter group and depressurization-pressurization means, comprising:

detecting parameters of said gaseous flow in said at least one vacuum line or duct, and adjusting said flow by varying the depressurizing-pressurizing power of said depressurization-pressurization means as a function of the detected parameters of said flow.

BRIEF DESCRIPTION OF THE DRAWINGS

Further aspects and advantages of the present invention will be clearer from the following detailed description of several currently preferred embodiments of a reduced-pressure granular material transport plant, illustrated as indicative and non-limiting examples in the accompanying drawings, in which.

DETAILED DESCRIPTION OF THE PREFERRED EMBODIMENTS

Figure 1:
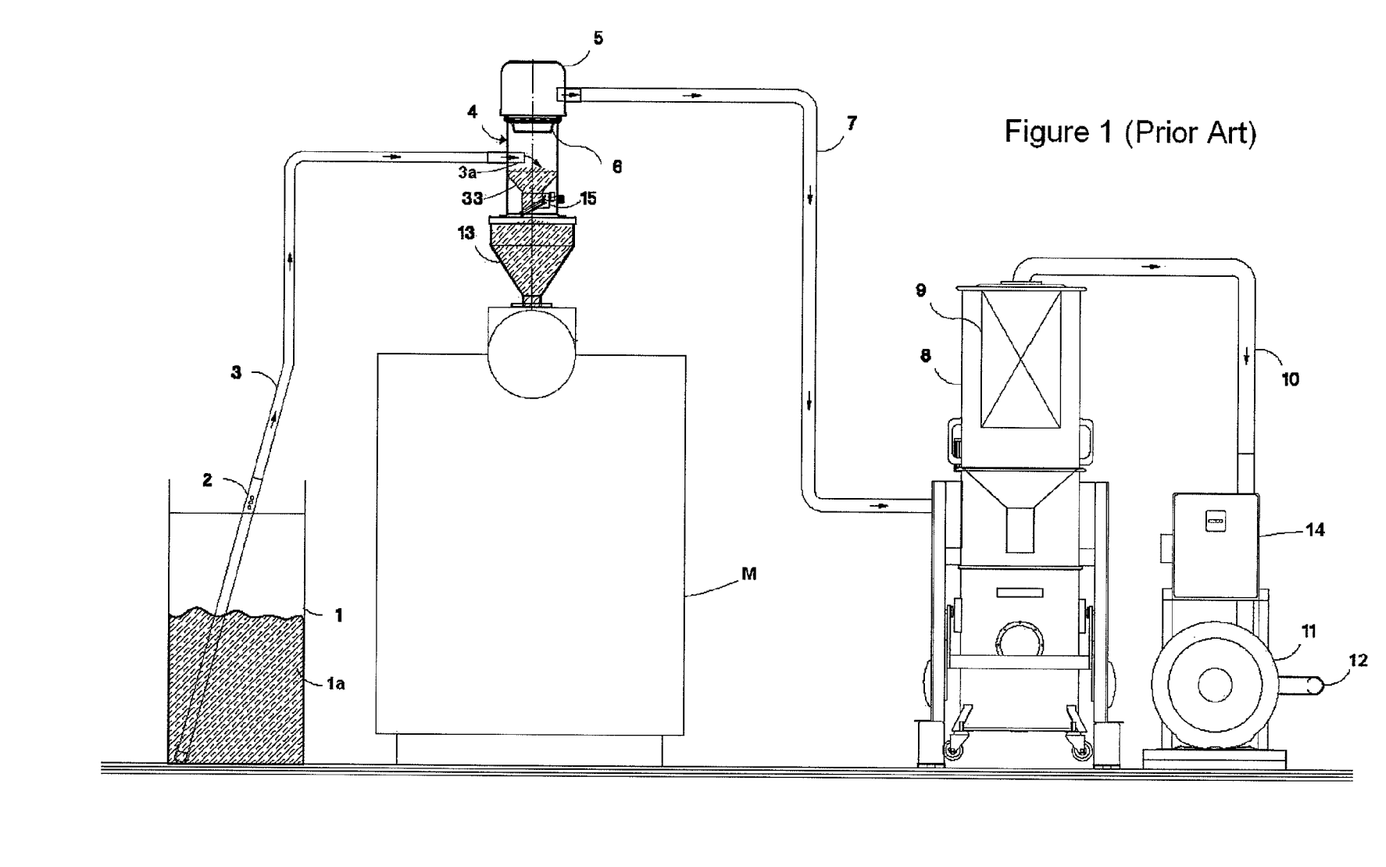
FIG. 1 is a schematic front elevation view of a conventional reduced pressure transport plant.
Figure 2:
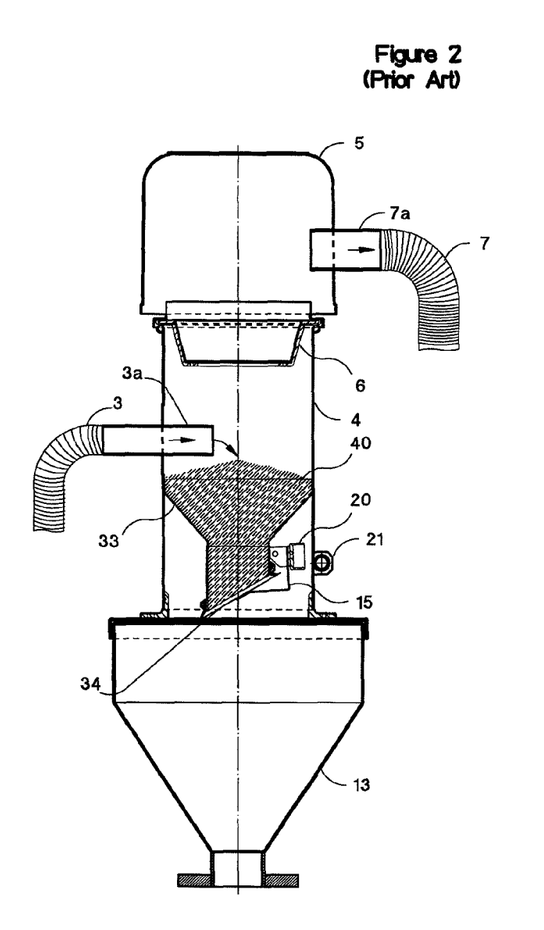
FIG. 2 illustrates an enlarged scale detail of the plant of FIG. 1 in a first operating position.
Figure 3:
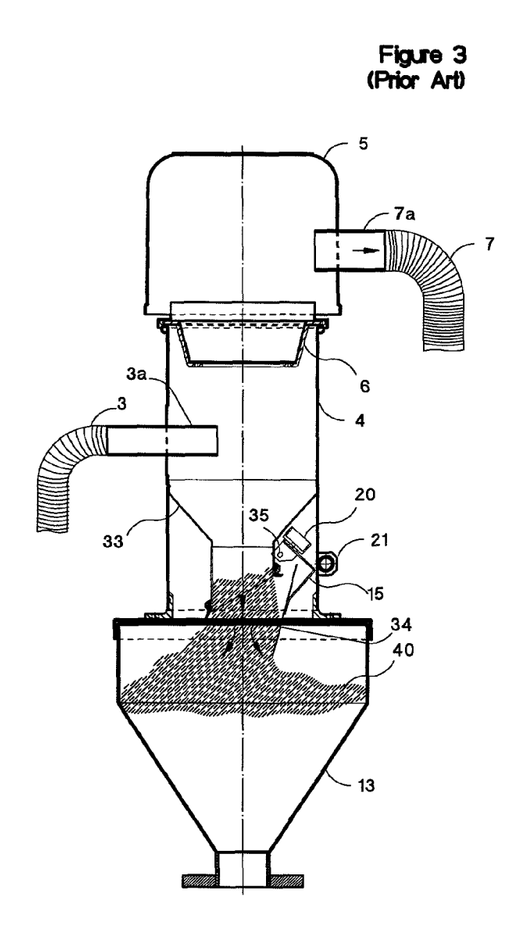
FIG. 3 shows the detail of FIG. 2 in a second operating position.

With reference first to FIGS. 1 to 3, it will be noted that a conventional reduced pressure transport plant of granular material comprises a container 1 of any suitable type containing a specific amount of granular material 1a to be transported, a fluidizing lance member 2 drawing in granular material 1a, e. g. formed by a substantially rigid tube, intended to capture material granules and mix them with air, as will be further described below. The lance member 2 is in fluid communication with one end of a tube or hose 3, which can be of both rigid and flexible type and whose other end penetrates in an intermediate portion of a hermetically-sealed receiver-meter device 4 and defines a discharge mouth 3a.

Within the receiver-meter device 4, at a lower level than that of the discharge mouth 3a, a small metering hopper 33 is provided equipped with lower discharge mouth that can be opened and closed by a bottom flap 34 supported by a projecting arm 15 in turn pivoted at 35 to the hopper, thereby being arranged to oscillate about a horizontal axis. The discharge mouth is illustrated closed in FIG. 2, while in FIG. 3 it is open, in order to discharge granular material 1a conveyed and collected in the metering hopper 33 into an underlying hopper 13 set to act as a feed storage of plastic granular material 1a for a transformer machine generally indicated with M.

The rotatable equipment formed by the bottom flap 34 and by the support arm 15 is provided with a counter-weight 20 that encloses a magnet (not shown in the drawings) and an electromagnetic alignment sensor 21. With this structure, when granular material is not present in the metering hopper 33, the bottom flap 34 comes to automatically close the discharge mouth of the hopper 33, due to the presence of the counterweight 20 and the vacuum, and the magnet enclosed in the counterweight aligns with the magnetic sensor 21, thus generating an electrical signal. Such electrical signal is sent, e. g. by means of electric cable, to a receiving unit, as will be further described below.

The transport air of the granular material 1a coming from the container 1 is separated from the granular material falling inside the receiver-meter 4 and is suctioned, possibly through a first filter 6, via a mouth 7a placed in the upper head or portion 5 of the receiver-meter 4 and in fluid communication with one end of a rigid or flexible duct 7, whose other end leads to a cyclone filtering group 8. The latter is equipped with inner filter 9 with high filtering capacity and traps even small particles dispersed in the air that crosses it.

From the cyclone filtering group 8, a flexible duct 10 departs which is connected to a vacuum source, typically to the suction mouth of a vacuum pump or a blower 11 provided with an electric control panel 14, that expels the air drawn through the ducts 3, 7 and 10 directly into the ambient air, e. g. by means of a duct 12.

If the vacuum pump 11 is stopped, the granular material possibly contained in the meter hopper 33, due to the lack of vacuum and the weight of the granular material therein contained, causes the discharge mouth of the hopper 33 to open, so that any granular material is discharged into the underlying hopper 13.

When the magnet associated with the counterweight 20 is aligned with the magnetic sensor 21, an electric control signal is generated that is sent to the electric panel 14 of the blower or vacuum pump 11, which is thus actuated, giving rise to a new granular material feed cycle. The cycle is timed and can be varied as a function of the size of the receiver-meter 4, of its distance from the container 1 and/or of the type of granular material to be transported.

Figure 4:
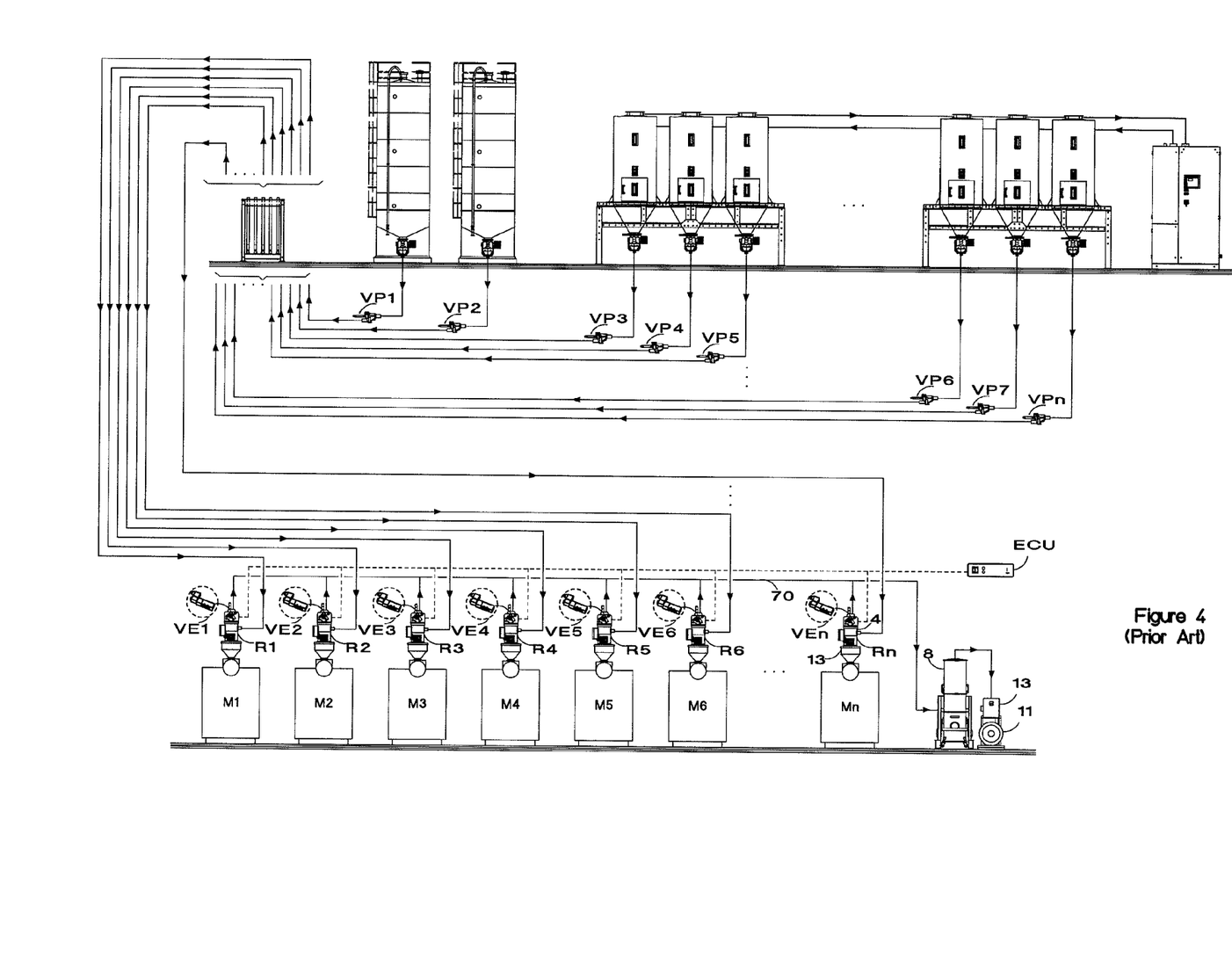
FIG. 4 is a diagrammatic view of a centralized reduced-pressure transport plant of granular material from several granular material sources and the same number of transforming machines of the same material.

With a plant of the above-described type, it is possible to carry out the transport of plastic granular material for distances up to 200 m, even for feeding several machines for the transformation of plastic granular materials, in which case the plant is called a "centralized" transport plant in jargon. One example of a centralized reduced pressure transport plant is illustrated in FIG. 4, where a single suction unit (pump or blower) 11 is provided and a cyclone filtering group 8 is arranged upstream of the suction unit. The various receivers-meters 4 of number n, for example 28 receivers-meters, are in fluid communication with the filtering group 8 by means of a common duct 70, termed "vacuum line" in jargon. In other words, the vacuum line 70 can serve a number n of transformation machines M1, M2, . . . , Mn. Preferably, the receiver-meters 4 are each equipped with an interception valve (not illustrated in the drawings) placed inside its respective head 5, which is drivable by a respective electro-pneumatic valve VE1, VE2, . . . , VEn, in turn, controlled by a suitable electronic control unit ECU set to control every zone of the plant, in particular energizing at one time one or another receiver-meter 4 according to operating needs. This plant type is particularly indicated for conveying granular material over relatively large distances, on the order of 200 m. In this case, it is necessary to employ a very powerful suction unit 11, since the loss loads must be overcome, which are obviously much greater for high distances, keeping in mind that installing several suction units would lead to prohibitive costs.

With every cycle, the conveyance line L1, L2, ..., Ln is hit with a pre-established quantity of air and granular material and at the end of every cycle it is completely evacuated of granular material, owing to the presence of an interceptor device, termed "cleaning valve", VP1, VP2, ..., VPn provided for each receiver-meter 4, so that when the suction unit 11 is stopped, the conveyance line L1, L2, ..., Ln is emptied. One such plant is in particular used when one must feed, in subsequent cycles, different granular materials to several machines for the transformation of plastic granular material.

Should the conveyance line L1, L2, ..., Ln be not emptied at the beginning of every cycle, the tubing could be contaminated or even obstructed by granules of the previously conveyed material and the suction unit 11 may not be able to create a sufficient suction effect suitable for ensuring both the evacuation of the air and the transport of granular material.

One of the problems that occurs in conventional reduced pressure transport plants of this type is that the flow speed or intensity of the granules inside the tubes does not remain constant, but varies, up to even doubling, with the variation of the work conditions.

Figure 5:
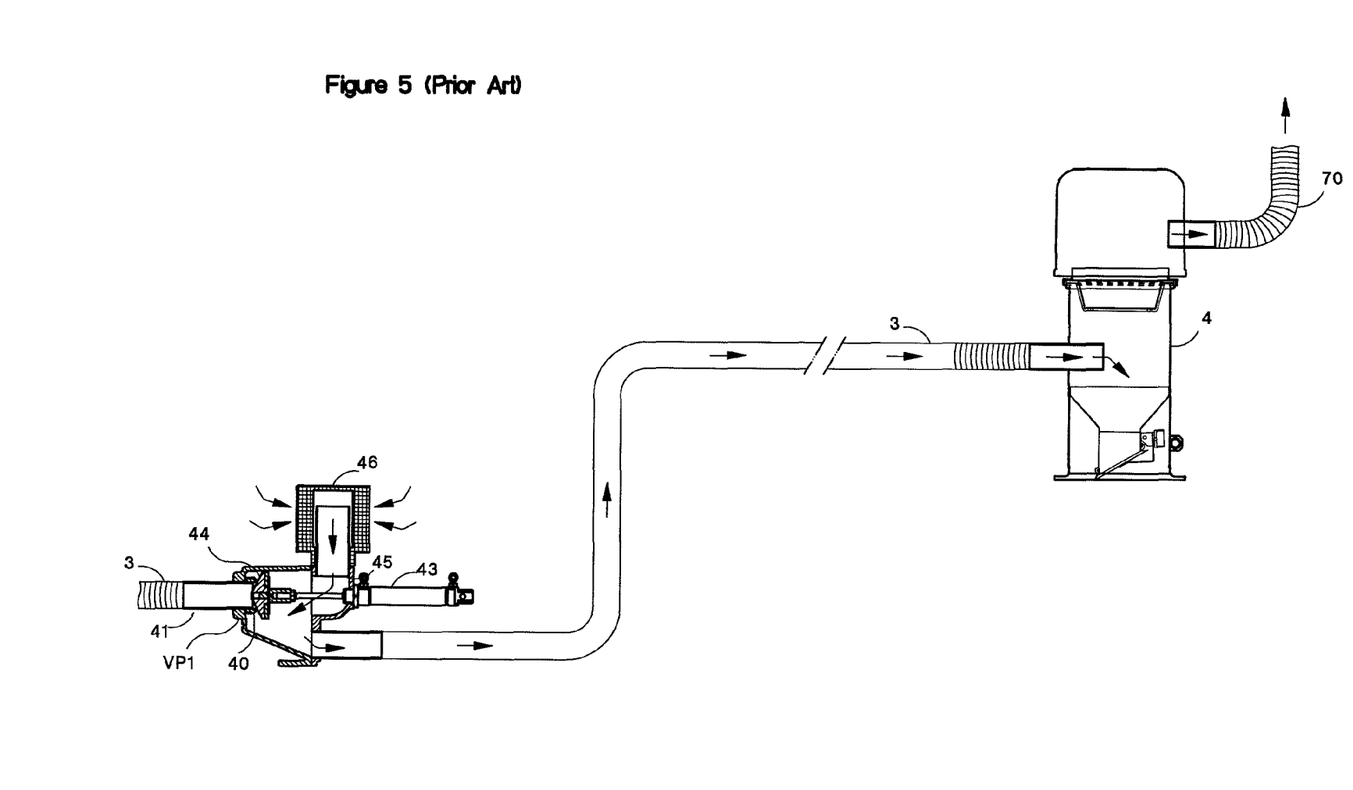
FIG. 5 shows a partial, schematic view on an enlarged scale of a cleaning device of the granular material conveyance ducts provided in the plant of FIG. 4.

In FIG. 5, a typical cleaning valve is illustrated, indicated with VP1 and inserted in the feed duct 3 of a respective receiver-meter 4. It comprises a valve body, in which an air and granular material inlet mouth 40 is obtained, where e. g. a nozzle 41 is provided for a first section of duct 3 in communication with the respective lance member 2. An outlet mouth is also provided in the valve body, preferably placed in offset position with respect to the inlet mouth 40, from which a second section of the feed duct 3 departs, directed to the receiver-meter 4. In front of the inlet mouth, but on opposite side thereof, a receiving opening is formed in the valve body for a linear actuator device 43 of any suitable type, which is set to control a preferably conical plug element 44, moving it on command of the electronic control unit ECU between a closed position, as shown in FIG. 5, in which it closes the inlet mouth 40 or the nozzle 41, and an open position far from the mouth 40 or the nozzle 41.

An ambient air inlet opening 45 is also formed in the valve body, externally provided with a filter 46, whereas within the valve body such opening 45 can be intercepted by the plug element 44 when it is moved into open position by the actuator 43. With this structure of the cleaning valve VP1, when the plug element is moved into closed position of the inlet mouth 40 or of the nozzle 41, only ambient air is suctioned through the filter 46 and thus through the receiver-meter 4 in order to carry out a cleaning cycle of the tubing.

In a granular material transport cycle, i.e. when the cleaning valve VP1 places the tube section 3 in communication with the lance member 2, with the second section of tube 3 in communication with its respective receiver-meter 4, due to the reduced pressure created by the suction unit 11, the granular material is caused to move and accelerate until it reaches a so-called "equilibrium" speed.

The initial acceleration imparted to the granular material mainly depends on the fact that the granular material at the start finds the second section of tube 3, that directly communicating with the receiver-meter 4, to be completely empty, and as it receives granular material, the load losses of the internal air flow and the friction against the walls increase, and consequently the speed of the suctioned air flow decreases. These factors ensure that the acceleration imparted to the plastic granular material 1 a gradually decreases until it reaches the equilibrium speed.

The same occurs when at the cycle's end the linear actuator 43 moves the plug element 44 into closed position against the inlet mouth 40 or the nozzle 41, thus allowing the suction of ambient air through the filter 46 in order to start the cleaning of the tubing. In this step, the speed of the plastic material granules present in the second section of the duct 3 tends to progressively increase, until complete emptying of the tubing has been obtained, achieving flow intensity values that are even double that of the equilibrium speed. At one such speed, the plastic material granules 1a scrape against the walls of the tubes, in particular at the curved sections of the tubes; consequently, a thin film is deposited, especially at rough areas of the material (usually metal) composing the tube, giving rise to the angel-hair phenomenon mentioned above.

Figure 6:
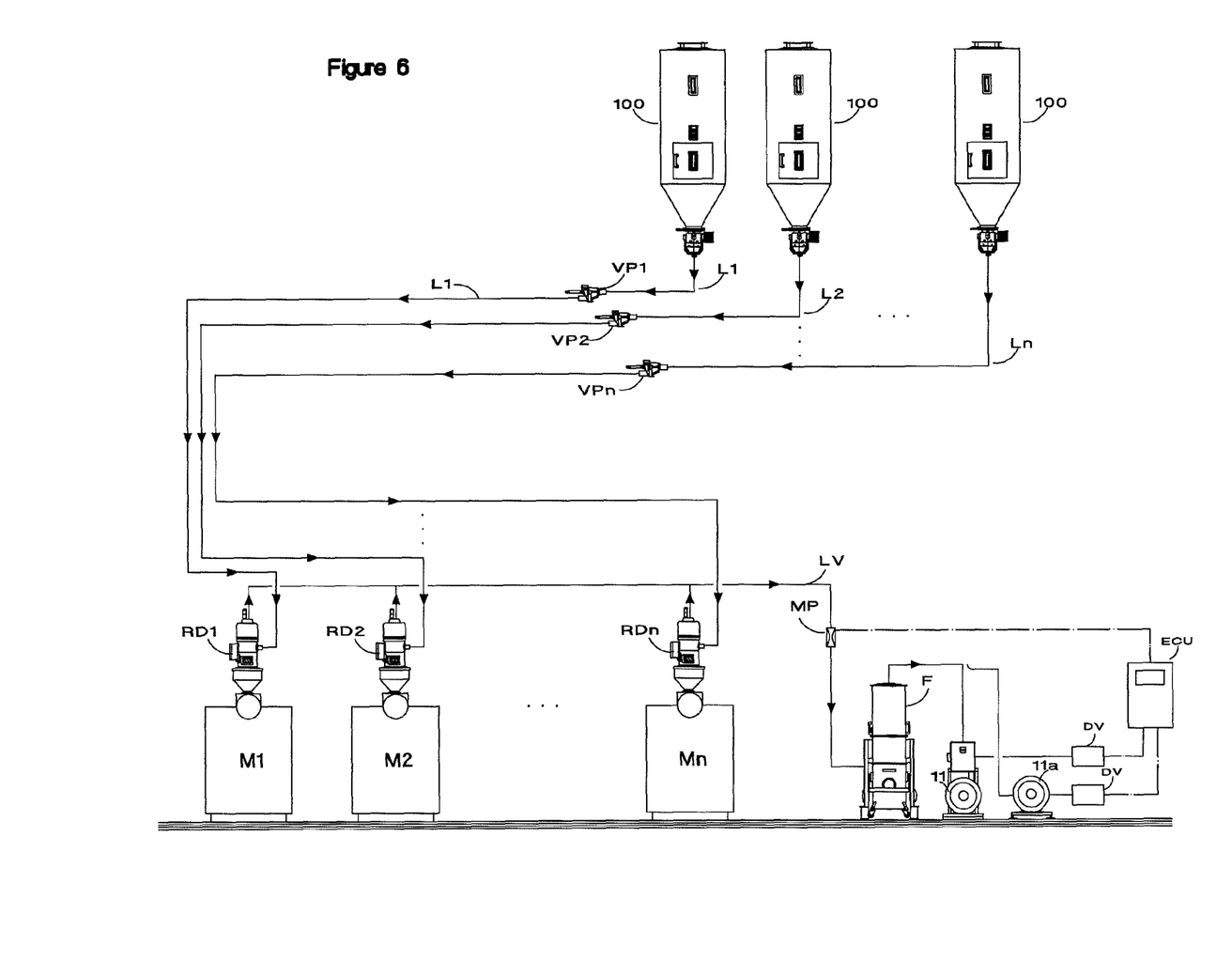
FIG. 6 illustrates a centralized reduced pressure transport plant of granular material from several granular material sources and the same number of transforming machines, the plant being provided with a set of cleaning devices as illustrated FIG. 5.

With reference to the embodiment of the present invention illustrated in FIG. 6, a reduced pressure transport plant of granular materials comprises one or more granular material containers or silos 100, from which such material is suctioned by means of one or more suction units 11, e. g. formed by one or more vacuum pumps, and a gaseous medium or fluid, e. g. air or nitrogen, which brings the granular material 1a therewith.

The various containers 100 of granular material 1a are in fluid communication by means of a respective duct L1, L2, ..., Ln with a respective receiver-meter RD1, RD2, ..., RDn, each duct L1, ..., Ln being interceptable by a respective cleaning valve VP1, VP2, ..., VPn.

The outlet for air from each receiver-meter RD1, RD2, ..., RDn is connected to a common vacuum line LV, in which an air flow rate meter MP is provided, e. g. comprising a Venturi meter of any suitable type, which is electrically connected with an electronic control unit ECU.

Moreover, the plant comprises one variator device DV per suction unit 11, which is arranged to vary the power or typically the rotation speed of the electric motor (not shown in the drawings) for actuating the respective suction units. Such speed variator device is preferably of electronic type, e. g. a so-called inverter, of any suitable type, which is intended to vary the frequency of the power supply current to the motor of its respective suction unit, and is in turn controllable by the electronic control unit ECU.

The air flow rate meter MP is designed to send electrical signals to the input of the electronic control unit ECU which are correlated to the air flow rate in the vacuum line LV. The electronic control unit ECU processes the signals received in input in order to generate control signals to be sent to the speed variator device(s) (inverter(s)) DV, which correspondingly vary the frequency of the power supply current to the motor of the suction unit(s) 11, 11a. In this manner, the depressurization or vacuum level and consequently the speed of the granular material 1a traveling along the tubes is adjusted as a function of the variations in the transport conditions of the material, which as stated above can vary when passing, for example, from the filling step to the unloading step of the granular material in the various suction lines L1, L2, ..., Ln of the granular material 1a.

More particularly, since there is a correlation between the parameters formed by flow rate, air speed and the vacuum level inside the tubes, the electronic control unit ECU through the inverter(s) DV modulates the rotation speed of the motor, and thus the power of each suction unit 11, thereby producing an initial acceleration ramp of the granular material 1a as a function of the variation of the depressurization or vacuum level. Subsequently, when an increase occurs of the load losses following the deposit of granular material on the inner surface of the vacuum line LV, the flow rate meter MP detects the flow rate variation caused by the load losses, which results in the variator device(s) DV (inverter(s)) increasing its rotation speed and thus the power of the respective suction unit 11, 11a. In such a manner, the flow rate decrease is gradually compensated, thus maintaining the granular material 1a movement speed constant over time along the ducts, or thus obtaining, if the circumstances require it, a variable speed progression over time.

In the tube cleaning step, on the other hand, the reverse process occurs. Once the feed of granular material 1a to the respective receiver-meter RD1, RD2, ..., RDn is stopped, the air speed in the reduced pressure tubing increases. The flow rate meter MP consequently detects a flow rate variation and sends a corresponding signal to the electronic control unit ECU, which will consequently drive the speed variator device(s) DV.

A control microprocessor (not shown), e. g. a PLC of any suitable type placed in the electronic control unit ECU, is set to create different transport condition profiles as a function of the type of granular material 1a to be transported. Typically, in a first storage portion of the control microprocessor, a table is pre-stored, which is none other than a list of a first array of plastic granular materials 1a with their respective characteristic parameters of their respective optimal transport speed profile. In a second storage portion, the operator of the reduced pressure transport plant can store the parameters of possible new granular materials, defined "experimental", through a suitable user interface, e. g. consisting of a video unit (monitor) and access means to the microprocessor for the data insertion, e. g. a keyboard and/or a mouse. Preferably, the user interface is a graphical interface with objects of "touch-screen" type.

With such device, it is possible to process any granular material 1a, feeding it at the most suitable speed, without generating powders, eliminating possible speed peaks, reducing the transport tube wear by the conveyed granular materials, optimizing the various cycles in a completely automatic manner, without risking the obstruction of the transport ducts, adapting the performances and productivity of the plant as a function of the transported granular material and eliminating every impact of the filtering effect on the speed and/or reduced pressure level prevailing during the transport.

According to an advantageous variation of a reduced pressure pneumatic transport plant according to the present invention, the suction units 11 and 11a or possibly further provided suction units, all equipped with a respective inverter DV, operate for example in stand-by since they are connected in parallel with each other, and are intended to begin operating in an alternating manner or simultaneously if conditions require it in order to increase the power, i.e. the depressurization level in the vacuum line LV and in the receiver-meters RD1, RD2, ..., RDn.

A reduced pressure transport plant as described above can be used with only one suction unit 11 in order to ensure the feed of granular material 1a to a single transformation machine or array of transformation machines M1, M2, ..., Mn.

Figure 7:
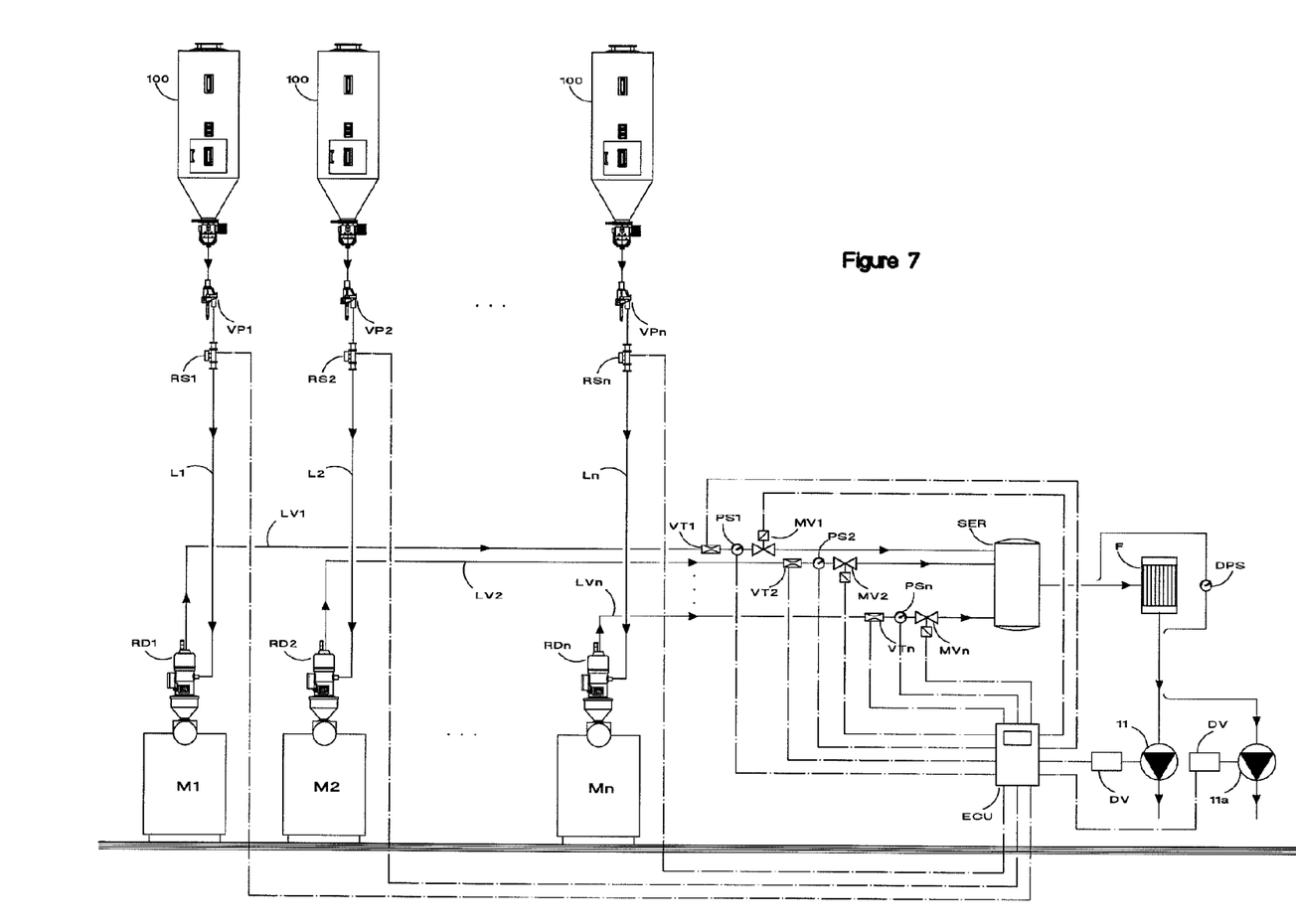
FIG. 7 illustrates a schematic view of a further embodiment of a reduced pressure transport plant of granular material according to the present invention.

Another reduced pressure transport plant of granular material according to the present invention will be described below with reference to FIG. 7, where the same reference numbers are used for indicating components already described with reference to the embodiment of FIG. 6. Such plant provides for the presence of a suction unit 11 equipped with inverter DV. Advantageously, one or more auxiliary suction units 11a can be connected in parallel to the suction unit 11, also equipped with inverter DV, similar to that described with reference to the embodiment illustrated in FIG. 6.

Also provided is a reduced pressure storage tank SER of any suitable type, into which the various vacuum lines LV1, LV2, ..., LVn converge of the respective receivers-meters RD1, RD2, ..., RDn serving a respective transformation machine M1, M2, ..., Mn. The tank SER is arranged upstream of the suction unit 11.

Preferably, downstream of the tank SER, a filtering group F is provided for, to which the air suctioned by the tank SER is directed in order to be filtered before reaching the suction unit(s) 11, 11a. Moreover, according to such embodiment a differential pressure meter DPS is also provided for of any suitable type, intended to measure the load loss due to the obstruction of the filtering group F and to generate respective electrical signals to be sent to the input of an electronic control unit ECU.

Starting from each container 100 of granular material to be transferred, a feed duct L1, L2, ..., Ln departs that is intended to feed granular material to a respective receiver-meter RD1, RD2, ..., RDn. Provided in series in each conveyance line L1, L2, ..., Ln is both a cleaning line VP1, VP2, ..., VPn and a detection means RS1, RS2, ..., RSn of the speed of the granular material that moves inside the respective feed line, e. g. comprising a sensor known in the state of the art and based on the interaction of the flow of the solid material moving in the feed line with a suitable electromagnetic signal, e. g. low energy microwaves, which send corresponding control signals to the input of the electronic control unit ECU.

In each vacuum line LV1, LV2, ..., LVn, the following are provided in series:
  an air flow rate meter VT1, VT2, ..., VTn, e. g. comprising a Venturi meter of any suitable type,
  a pressure meter PS1, PS2, ..., PSn intended to measure the pressure in the respective vacuum line LV1, LV2, ..., LVn and to send corresponding signals to the input of the electronic control unit ECU, and
  a motorized valve MV1, MV2, ..., MVn of any suitable type arranged to maintain a correct reduced pressure or vacuum level in the respective vacuum line LV1, LV2, ..., LVn as well as in its respective receiver-meter RD1, RD2, ..., RDn.

The electronic control unit ECU is designed to process the signals received in its input and to send, if deemed necessary, control signals to one or more of the motorized valves MV1, MV2, ..., MVn, thereby obtaining a desired speed profile for each specific granular material to be fed to the transformation machines M1, M2, ..., Mn, as well as to the speed variator device(s) DV, which modulate the rotation speed and thus the power of the respective suction units 11, 11a, thus always maintaining a desired reduced pressure level or vacuum level in the vacuum storage tank SER.

The electronic control unit ECU is suitable for diversifying the functioning parameters in the various vacuum lines LV1, LV2, ..., LVn and in its respective receiver-meters RD1, RD2, ..., RDn based on the pre-established movement speed for every type of granular material inside each conveyance line L1, L2, ..., Ln.

Of course, also in this embodiment, through a control microprocessor of the electronic control unit ECU, e. g. a PLC, of any suitable type, it is possible to store different transport condition profiles as a function of the material type for every transport line.

Alternatively, if it is desired to diminish the plant costs, in place of the pressure meters PS1, PS2, . . . , PSn a single pressure meter can be provided, such meter being designed to carry out the measurement of the reduced pressure in the vacuum storage tank SER and to send corresponding control signals to the input of the electronic control unit ECU.

The above-described plant is susceptible to numerous modifications and variations within the protection scope as defined by the claims.

Thus, in place of suction means of the air or another gaseous fluid, pressing or pressurizing means can be provided, obtaining entirely similar results.

What is claimed is:

1. A process for the transport of plastic granular material in a plant, the process comprising
    loading a plastic granular material to be transported in at least one container,
    coupling at least one receiver-meter group designed to receive the plastic granular material from the at least one container via at least one conveyance duct extending from the at least one container to the at least one receiver-meter group,
    at least one vacuum duct extending between the at least one receiver-meter group and a force generating structure to facilitate generating a gaseous medium for conveying the granular material to be transported from the at least one container to the at least one receiver-meter group and creating a flow of the granular material and the gaseous medium in the at least one conveyance duct to the at least one receiver-meter group and a flow of gaseous medium from the at least one receiver-meter group to the force generating structure in the at least one vacuum duct,
    locating speed detection means in the at least one vacuum duct for measuring a flow of the gaseous medium from the at least one receiver-meter group to the force generating structure,
    receiving input control signals from the speed detection means, relating the flow of the gaseous medium, and emitting control signals to a drive which drives the force generating structure for adjusting a flow rate of the gaseous medium, and
    following conveyance of the granular material to be conveyed, utilizing a cleaning valve, located along the conveyance duct to evacuate the granular material from the conveyance duct.

2. The process of claim 1, further comprising:
    receiving input signals, via an electronic control means, relating to the detected parameters of the granular material, the conveyance force and the material flow along the conveyance duct;
    processing the input signals, via the electronic control unit, and emitting control signals to an electric motor variator device which drives the force generating structure; and
    the emitting control signals at least one of varying a rotation speed of the electric motor variator device and a frequency of a power supply current to the electric motor variator device.

3. The process according to claim 1, further comprising using a vacuum pump as the force generating structure and a vacuum line as the conveyance duct so that a depressurization force is exerted by the vacuum pump along the vacuum line.

4. The process according to claim 1, further comprising using a blower as the force generating structure so that a pressurization force is exerted by the blower along the conveyance duct.

5. The process according to claim 1, further comprising having a plurality of container which are each loaded with a plastic granular material to be transported,
    coupling a separate receiver-meter group designed to receive the plastic granular material from the respective container via a respective conveyance duct extending from the respective container to the respective receiver-meter group,
    having a common vacuum duct extending between each respective receiver-meter group and the force generating structure to facilitate generating a gaseous medium for conveying the granular material to be transported from each respective container to each respective receiver-meter group,
    locating a speed detection means in common vacuum duct for measuring a flow of the gaseous medium.

6. A process for the transport of plastic granular material in a plant, the process comprising
    loading a first granular material to be transported in a first container, and a second granular material to be transported in a second container,
    coupling a first receiver-meter group designed to receive the first plastic granular material from the first container via a first conveyance duct extending from the first container to the first receiver-meter group and coupling a second receiver-meter group designed to receive the second plastic granular material from the second container via a second conveyance duct extending from the second container to the second receiver-meter group,
    a first vacuum duct extending between the first receiver-meter group and a first force generating structure to facilitate generating a gaseous medium for conveying the first granular material to be transported from the first container to the first receiver-meter group and creating a flow of the first granular material and the gaseous medium in the first conveyance duct to the first receiver-meter group and a flow of gaseous medium from the first receiver-meter group to the first force generating structure in the first vacuum duct and a second vacuum duct extending between the second receiver-meter group and a second force generating structure to facilitate generating a gaseous medium for conveying the second granular material to be transported from the second container to the second receiver-meter group and creating a flow of the second granular material and the gaseous medium in the second conveyance duct to the second receiver-meter group and a flow of gaseous medium from the second receiver-meter group to the second force generating structure in the second vacuum duct,
    locating a first speed detection means in the first vacuum duct for measuring a flow of the gaseous medium from the first receiver-meter group to the first force generating structure and locating a second speed detection means in the second vacuum duct for measuring a flow of the gaseous medium from the second receiver-meter group to the second force generating structure,
    receiving input control signals from the first speed detection means, relating the flow of the gaseous medium in the first vacuum duct, and emitting control signals to a first drive which drives the first force generating structure for adjusting a flow rate of the gaseous medium in the first vacuum duct and receiving input control signals from the second speed detection means, relating the flow of the gaseous medium in the second vacuum duct, and emitting control signals to a second drive which drives the second force generating structure for adjusting a flow rate of the gaseous medium in the second vacuum duct, and following conveyance of the first granular material to be conveyed, utilizing a cleaning valve, located along the first conveyance duct to evacuate the first granular material from the first conveyance duct and following conveyance of the second granular material to be conveyed, utilizing a cleaning valve, located along the second conveyance duct to evacuate the second granular material from the second conveyance duct.

\* \* \* \* \*

UNITED STATES PATENT AND TRADEMARK OFFICE
CERTIFICATE OF CORRECTION

Page 1 of 1

PATENT NO. : 9,440,802 B2
APPLICATION NO. : 13/752323
DATED : September 13, 2016
INVENTOR(S) : Moretto It is certified that error appears in the above-identified patent and that said Letters Patent is hereby corrected as shown below:

On the Title Page

Item (62) should read:
(62) Related U.S. Application Data
Divisional of application No. 12/155,996 filed June 12, 2018.

Insert:
--(30) Foreign Application Priority Data
June 12, 2007 (IT)..........................VR2007A000083--

Signed and Sealed this
Twenty-third Day of January, 2018

Joseph Matal
*Performing the Functions and Duties of the
Under Secretary of Commerce for Intellectual Property and
Director of the United States Patent and Trademark Office*